United States Patent
Lim (10) Patent No.: US 7,230,558 B2
(45) Date of Patent: Jun. 12, 2007

(54) COLUMN ANALOG-TO-DIGITAL CONVERSION APPARATUS AND METHOD SUPPORTING A HIGH FRAME RATE IN A SUB-SAMPLING MODE

(75) Inventor: Su-Hun Lim, Suwon-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

(21) Appl. No.: 11/403,026

(22) Filed: Apr. 12, 2006

(65) Prior Publication Data
US 2006/0262205 A1    Nov. 23, 2006

(30) Foreign Application Priority Data
May 18, 2005    (KR) .................... 10-2005-0041605

(51) Int. Cl.
*H03M 1/12* (2006.01)
(52) U.S. Cl. .................... 341/155; 341/156
(58) Field of Classification Search ............... 341/155, 341/143, 122, 156, 141; 348/294
See application file for complete search history.

(56) References Cited

U.S. PATENT DOCUMENTS

| | | | |
|---|---|---|---|
| 6,753,912 B1 * | 6/2004 | Wayne | 348/241 |
| 6,839,452 B1 * | 1/2005 | Yang et al. | 382/103 |
| 2004/0093475 A1 * | 5/2004 | Jo | 711/217 |

FOREIGN PATENT DOCUMENTS

| | | |
|---|---|---|
| JP | 2003101384 | 4/1991 |
| JP | 2003131170 | 6/1991 |
| KR | 20030008325 | 1/2001 |
| KR | 20020046957 | 6/2002 |

OTHER PUBLICATIONS

English Abstract for Publication No. 2003-101384, no month.
English Abstract for Publication No. 2003-131170, no month.
English Abstract for Publication No. 2002-0045957, no month.
English Abstract for Publication No. 2003-0008325, no month.

* cited by examiner

*Primary Examiner*—Peguy JeanPierre
(74) *Attorney, Agent, or Firm*—F. Chau & Associates, LLC (57) ABSTRACT

A column analog-to-digital conversion apparatus includes a first correlated double sampling (CDS) and comparison unit of a CDS and comparison circuit for generating a first comparison result signal in response to a first pixel output signal and a ramp signal, a second CDS and comparison unit of the CDS and comparison circuit for generating a second comparison result signal in response to the first pixel output signal and the ramp signal in a sub-sampling mode, and a data buffer for determining a code value of a most significant bit (MSB) based on the second comparison result signal, determining code values of remaining lower bits based on a counting value outputted from a counter, and generating a digital code including the MSB and the remaining lower bits.

23 Claims, 11 Drawing Sheets

COLUMN ANALOG-TO-DIGITAL CONVERSION APPARATUS AND METHOD SUPPORTING A HIGH FRAME RATE IN A SUB-SAMPLING MODE

CROSS-REFERENCE TO RELATED APPLICATIONS

This application claims the benefit of Korean Patent Application No. 2005-41605 filed on May 18, 2005 in the Korean Intellectual Property Office (KIPO), the contents of which are herein incorporated by reference in its entirety.

BACKGROUND OF THE INVENTION

1. Field of the Invention

The present invention relates to a column analog-to-digital conversion apparatus of a complementary metal-oxide semiconductor (CMOS) image sensor (CIS), and more particularly to a column analog-to-digital conversion apparatus and a method capable of supporting a high frame rate in a sub-sampling mode.

2. Description of Related Art

Compared with charge-coupled devices (CCDs), complementary metal-oxide semiconductor (CMOS) image sensors (CISs) operate at low voltages and have low power consumption. Also, the CMOS image sensors may be implemented in applications needing high-density integration using standard CMOS processes. For these reasons, the CMOS image sensors are widely used in various fields. The CMOS image sensors are expected to replace the CCDs in many fields in the future.

Unlike the CCDs, the CMOS image sensors convert analog signals from an active pixel sensor (APS) array into digital signals. For this conversion, the CMOS image sensors use an analog-to-digital converter (ADC).

The CMOS image sensors may be classified into a single ADC scheme or a column ADC scheme according to an implementation of the analog-to-digital conversion. The single ADC scheme converts APS analog output signals of all columns into digital signals within a given time by using a single ADC that operates at high speed. Although the single ADC scheme can reduce chip area, it has high power consumption as compared to the column ADC scheme because it operates at high speed. The column ADC scheme includes simple ADC circuits provided in each of the columns. The column ADC scheme has a large chip area and low power consumption as compared to the single ADC scheme. The column ADC scheme uses a comparator configured to perform a correlated double sampling (CDS) on APS analog output voltages and store resultant voltages. A ramp voltage generated from a ramp generator is supplied to a comparator. The comparator compares the ramp voltage with the voltage stored during the CDS operation.

As high-resolution images have become increasingly in demand, high-resolution CMOS image sensors have been developed. The high-resolution CMOS image sensors use a sub-sampling mode for supporting a high frame rate when capturing moving images. The high frame rate is supported by reducing the resolution using the sub-sampling mode.

In the case of the CMOS image sensor with the single ADC structure, the number of pixels to be analog-to-digital converted in the sub-sampling mode is reduced by a sub-sampling ratio in row and column directions. Therefore, if the CMOS image sensor operates at the same speed in a full resolution mode, the frame rate increases in proportion to the sub-sampling ratio in the row and column directions in the sub-sampling mode. However, in the sub-sampling mode, the column ADC structure cannot reduce time in the X-direction (refer to FIG. 3) because of its structural characteristics. The time needed to perform the analog-to-digital conversion of one horizontal line cannot be reduced. Consequently, the frame rate is increased by the sub-sampling ratio of the Y-direction.

Figure 1:
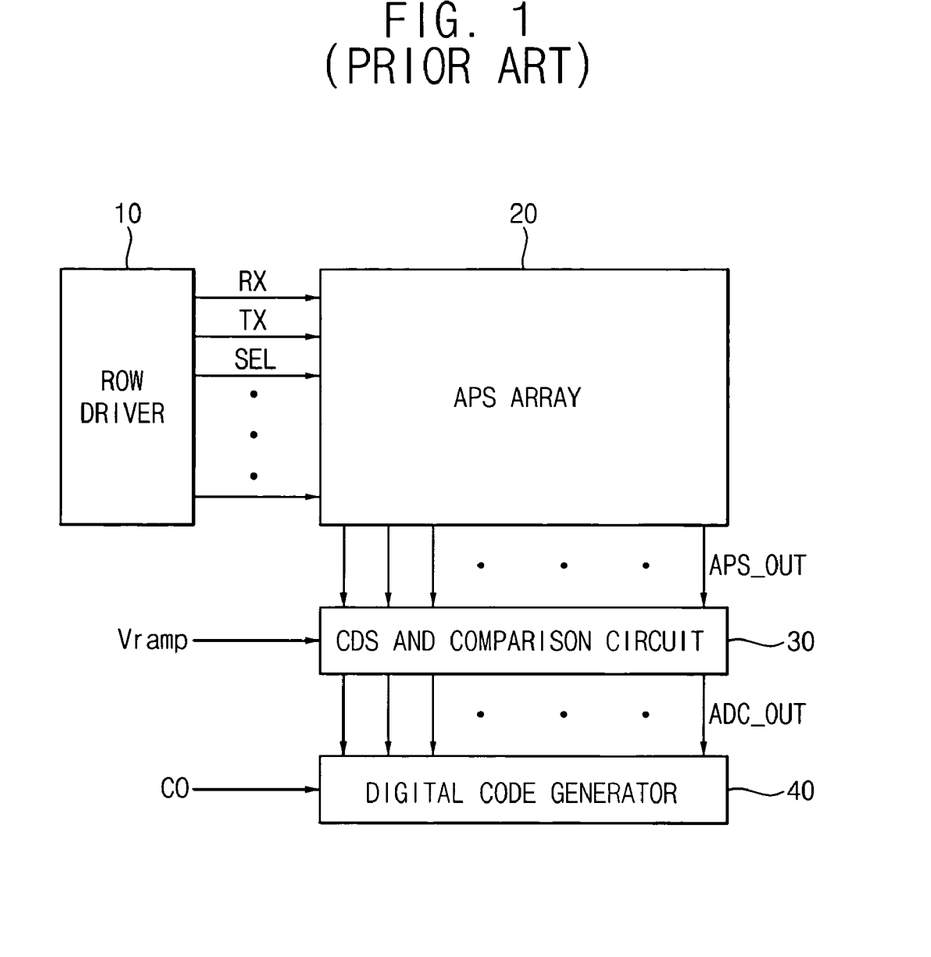
FIG. 1 is a block diagram illustrating a column-parallel type complementary metal-oxide semiconductor (CMOS) image sensor with a conventional correlated double sampling (CDS) structure.

FIG. 1 is a block diagram illustrating a column-parallel type CMOS image sensor with a CDS structure.

Referring to FIG. 1, the column-parallel type CMOS image sensor includes a row driver 10, an APS array 20, a CDS and comparison circuit 30, and a digital code generator 40.

The CDS and comparison circuit 30 is configured with capacitors and amplifiers for performing independent CDS operations on the respective APS columns and comparing CDS results.

In the sub-sampling mode, one signal of adjacent same-colored pixels is selected and outputted as a pixel output signal APS_OUT according to the sub-sampling ratio. The pixel output signal APS_OUT is converted into a digital code using a ramp signal Vramp and a counting value C0. All values from a most significant bit (MSB) to a least significant bit (LSB) are determined for each pixel output signal in accordance with the counting value C0 outputted from a counter (not shown). For example, if one pixel output signal has a 10-bit resolution, 1,024 clock cycles are needed to convert a signal of a brightest saturation state into a digital signal.

The CMOS image sensor with the column ADC structure cannot reduce a horizontal line time because it uses independent ADC circuits in each of the columns.

Therefore, a need exists for a CMOS image sensor having a reduced horizontal line time.

SUMMARY OF THE INVENTION

According to an exemplary embodiment of the present invention, a column analog-to-digital conversion apparatus includes a first correlated double sampling (CDS) and comparison unit of a CDS and comparison circuit for generating a first comparison result signal in response to a first pixel output signal and a ramp signal, a second CDS and comparison unit of the CDS and comparison circuit for generating a second comparison result signal in response to the first pixel output signal and the ramp signal in a sub-sampling mode, and a data buffer for determining a code value of a most significant bit MSB based on the second comparison result signal, determining code values of remaining lower bits based on a counting value outputted from a counter, and generating a digital code comprising the MSB and the remaining lower bits.

According to an exemplary embodiment of the present invention, a column analog-to-digital conversion apparatus includes a first CDS and comparison unit of a CDS and comparison circuit for generating a first comparison result signal in response to a first pixel output signal and a ramp signal, a plurality of second CDS and comparison units of the CDS and comparison circuit for generating a plurality of second comparison result signals in response to the first pixel output signal and the ramp signal in a sub-sampling mode, and a data buffer for determining code values of upper bits including an MSB (most significant bit) based on the plurality of second comparison result signals, determining code values of remaining lower bits based on a counting value outputted from a counter, and generating a digital code comprising the MSB and the remaining lower bits.

According to an exemplary embodiment of the present invention, a column analog-to-digital conversion method of a sub-sampling mode includes performing first and second correlated double sampling (CDS) operations in response to one pixel output signal, changing a ramp signal to at least one predetermined voltage level, generating at least one first comparison result signal by comparing a result of the second CDS operation with a voltage variation of a changed ramp signal, determining a code value of an upper bit based on the at least one first comparison result signal, changing a voltage level of the changed ramp signal, and determining a code value of a lower bit in response to the changed ramp signal of the operation (e), based on a counting value outputted from a counter.

BRIEF DESCRIPTION OF THE DRAWINGS

The present invention will become more apparent by describing in detail exemplary embodiments thereof with reference to the accompanying drawings, in which.

DETAILED DESCRIPTION OF PREFERRED EMBODIMENTS

Figure 2:
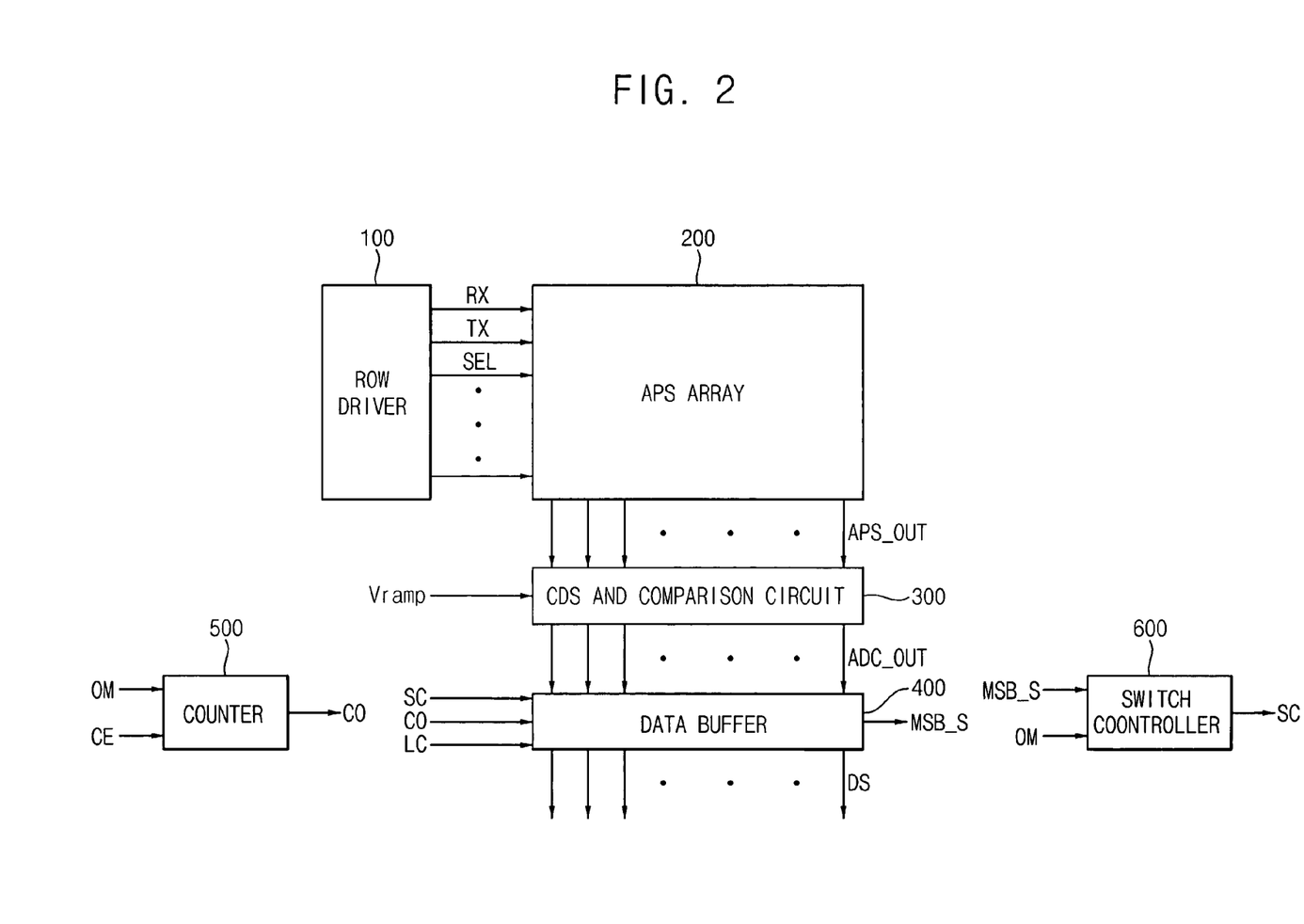
FIG. 2 is a block diagram illustrating a column-parallel type CMOS image sensor with an analog-to-digital conversion apparatus according to an exemplary embodiment of the present invention.

FIG. 2 is a block diagram illustrating a column-parallel type complementary metal-oxide semiconductor (CMOS) image sensor including an analog-to-digital conversion apparatus according to an exemplary embodiment of the present invention.

Referring to FIG. 2, the CMOS image sensor according to an exemplary embodiment of the present invention includes a row driver 100, an APS array 200, a correlated double sampling (CDS) and comparison circuit 300, a data buffer 400, a counter 500, and a switch controller 600.

The row driver 100 generates control signals RX, TX and SEL for controlling pixels of the APS array 200. The APS array 200 outputs corresponding pixel output signals APS_OUT via columns.

The CDS and comparison circuit 300 performs a CDS operation on the pixel output signals APS_OUT outputted by the APS array 200, performs a comparing operation on results of the CDS operation by using a ramp voltage Vramp, and outputs comparison result signals ADC_OUT via the columns.

The CDS operation includes sampling reset signals of the pixel output signals APS_OUT and sampling image signals. An output of the. CDS operation is a voltage difference ($\Delta V$) between the reset signal and the image signal.

The data buffer 400 outputs digital codes DS in each column, based on the comparison result signals ADC_OUT from the CDS and comparison circuit 300. In addition, the data buffer 400 outputs a most significant bit (MSB) signal MSB_S generated based on MSB code values of the digital codes DS.

The counter 500 generates a counting value C0 in response to an operation mode signal OM and a counter enable signal CE. The counting value C0 is transferred to the data buffer 400. The counter enable signal CE is activated at a time point when a voltage of the ramp signal Vramp begins to change for the CDS operation. The counter 500 starts to perform a counting operation in response to the activation of the counter enable signal CE.

The operation mode signal OM designates a normal mode or a sub-sampling mode. For example, in the case of a 10-bit counter, the counter 500 operates as the 10-bit counter in the normal mode, while the counter 500 operates as a 9-bit counter, except for the case of the MSB, in the sub-sampling mode, wherein only the lower bit code values of the digital codes DS are determined in the sub-sampling mode by the counter 500.

The switch controller 600 generates a switch control signal SC in response to the MSB signal MSB_S and the operation mode signal OM. The switch control signal SC is outputted to the buffer 400. The switch control signal SC is used as a control signal for switching a data path of the data buffer 400 based on the upper bit code values of the digital codes determined prior to the determination of the operation mode and lower bit code values.

Figure 3:
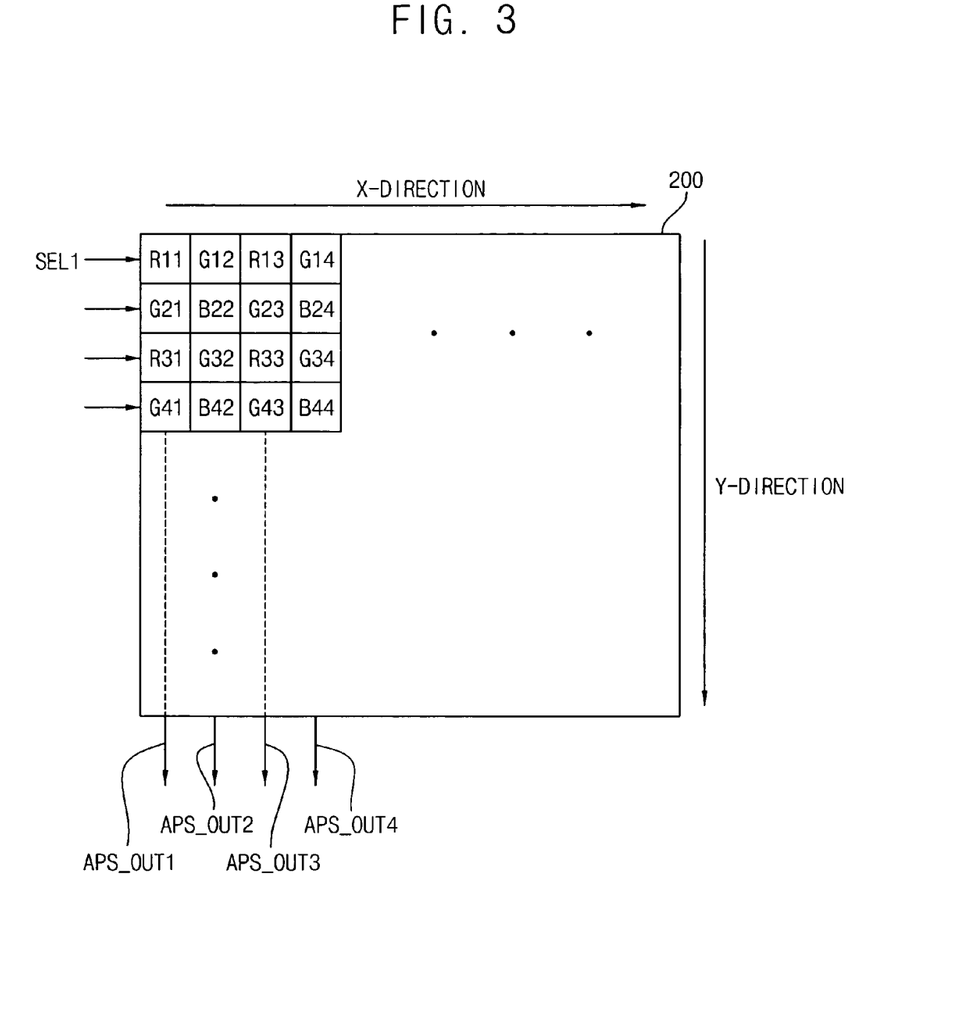
FIG. 3 is a diagram illustrating a pixel array based on Bayer pattern.

FIG. 3 is a diagram illustrating a pixel array based on a Bayer pattern.

Referring to FIG. 3, one of RGB colors is assigned to each pixel according to the Bayer pattern. Odd columns R11, R13, . . . of a first row are red pixels and are sub-sampled in the X-direction according to a sub-sampling ratio.

For example, assuming that the sub-sampling ratio is 1/2, the sub-sampling operation is performed in such a manner that one of R11 and R13 and one of R15 (not shown) and R17 (not shown) in the first row are selected. A sub-sampling operation in the Y-direction is performed in a similar manner.

Figure 4:
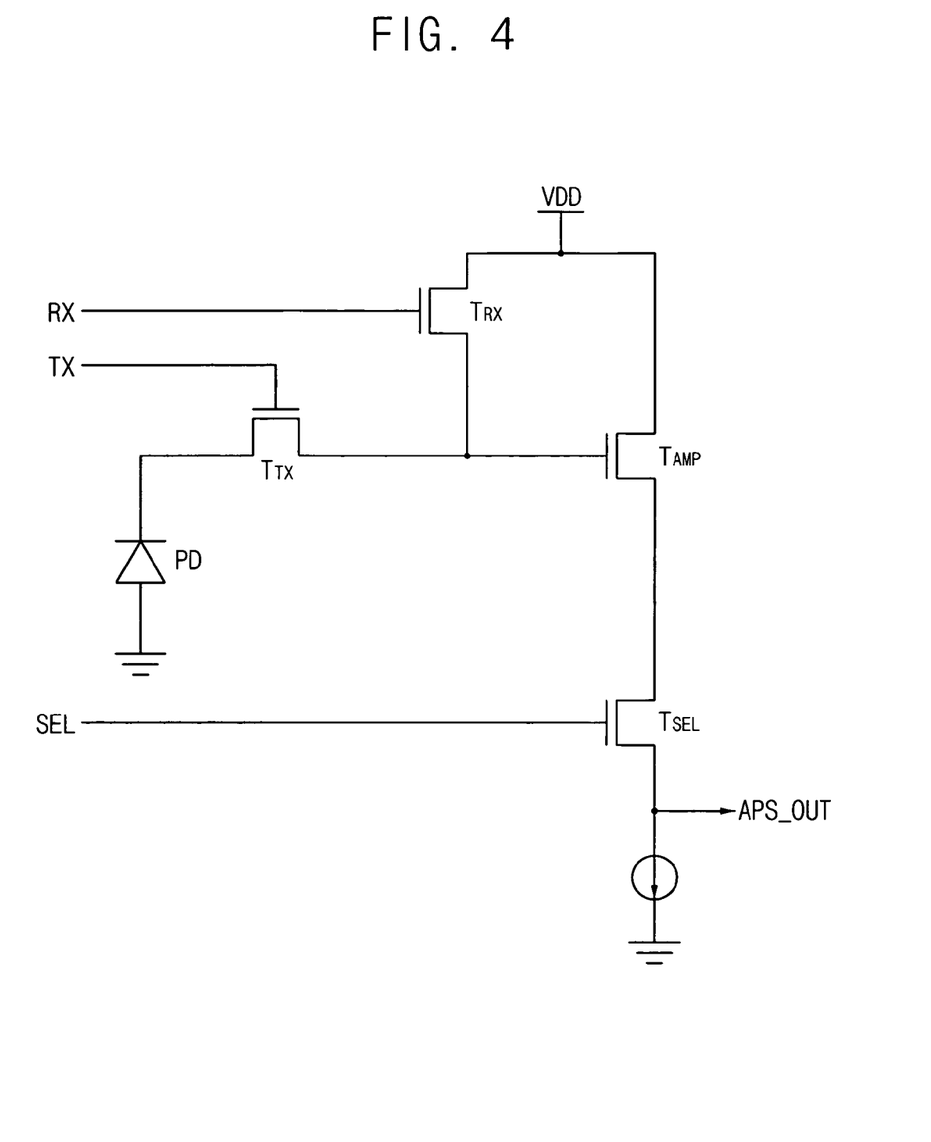
FIG. 4 is a circuit diagram illustrating a pixel structure.

FIG. 4 is a circuit diagram illustrating a pixel structure.

Referring to FIG. 4, a pixel with a 4-TR structure is illustrated. One pixel includes a photodiode PD, a transfer gate $T_{TX}$, a reset transistor $T_{RX}$, a source follower $T_{AMP}$, and a row select transistor $T_{SEL}$.

A CMOS image sensor is configured with a plurality of pixels constructed as described with respect to FIG. 4. In addition, an output of the row select transistor $T_{SEL}$ is inputted to a CDS circuit by using a bias transistor (not shown) of each column line as an output load.

Each of the column lines includes a CDS circuit. The CDS circuit samples a reset voltage and an image voltage, which are pixel output signals, and outputs a difference of the reset voltage and the image voltage. The reset voltage is a pixel output voltage when the reset transistor $T_{RX}$ is in an on state, and the image voltage is a pixel output voltage when the transfer gate $T_{TX}$ is in the on state.

Figure 5A:
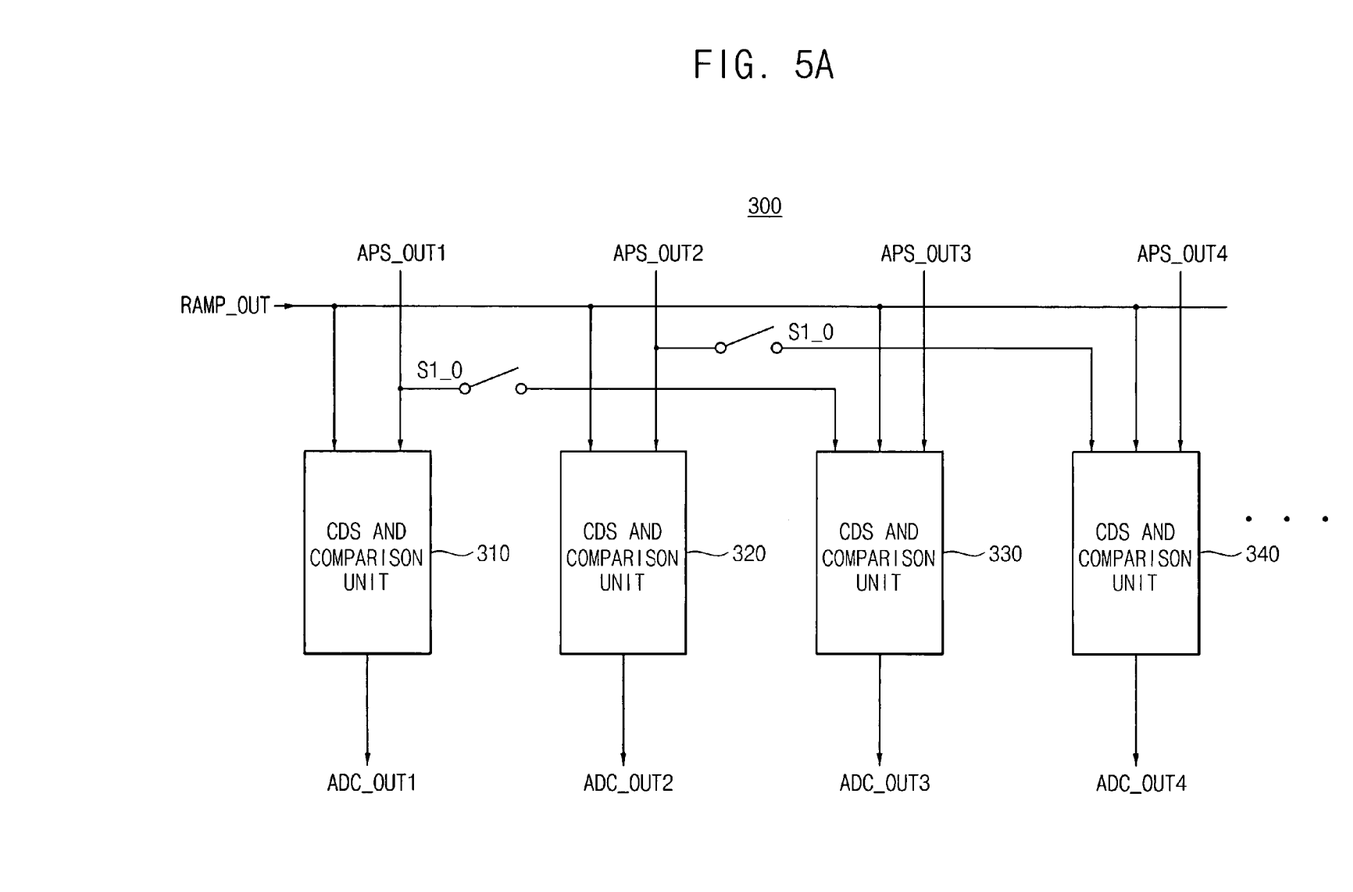
FIGS. 5A and 5B are a block diagram and a circuit diagram illustrating a CDS and comparison circuit according to an exemplary embodiment of the present invention.
Figure 5B:
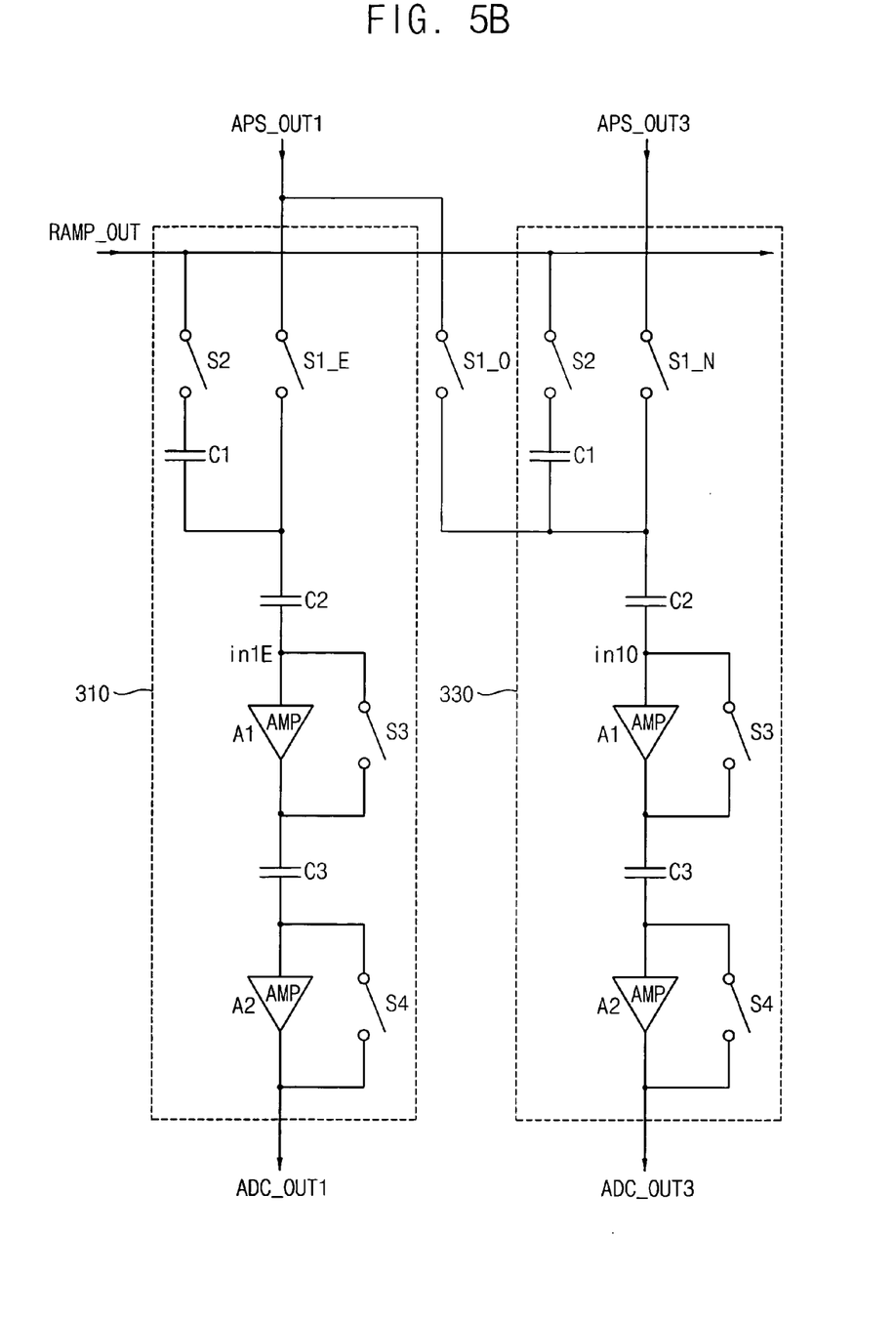

FIGS. 5A and 5B are a block diagram and a circuit diagram illustrating a CDS and comparison circuit 300 according to an exemplary embodiment of the present invention, respectively.

Referring to FIG. 5A, the CDS and comparison circuit 300 includes CDS and comparison units 310, 320, 330 and 340, and transfer switches S1_0. For convenience of explanation, a structure for four columns is illustrated in FIG. 5A. One of ordinary skill in the art would appreciate that a different number of columns may be implemented.

Each transfer switch S1_0 transfers a pixel output signal of one color to a CDS and comparison unit of an adjacent same-colored column in the sub-sampling mode. FIGS. 5A and 5B illustrate a structure when the sub-sampling ratio is 1/2. The sub-sampling operation is performed on R colors of the first and third columns and G colors of the second and fourth columns. If the sub-sampling ratio is 1/4, the sub-sampling operation is performed every four adjacent same-colored columns.

Referring to FIG. 5B, each of the CDS and comparison units 310 and 330 includes a ramp switch S2, a pixel output switch S1_E/S1_N, amp switches S3 and S4, capacitors C1, C2 and C3, and amplifiers A1 and A2. For convenience of explanation, a structure for the first and third columns is illustrated.

The amplifiers A1 and A2 may be configured with an inverter or comparator receiving a reference voltage. The transfer switch S1_0 is connected to a terminal of the capacitor C2 in the CDS and comparison unit 330 of the third column.

Figure 6:
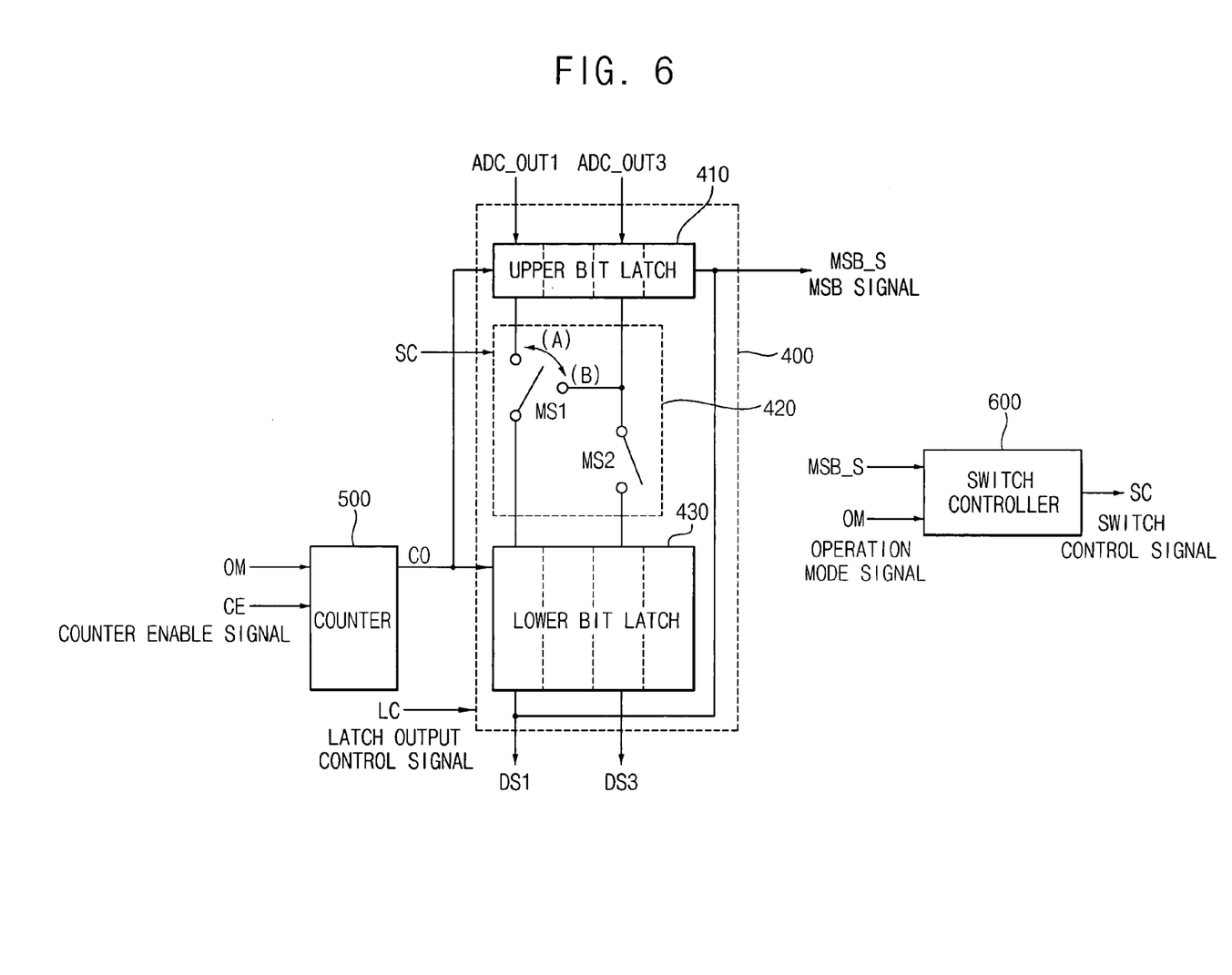
FIG. 6 is a block diagram illustrating a data buffer according to an exemplary embodiment of the present invention.

FIG. 6 is a block diagram illustrating a data buffer 400 according to an exemplary embodiment of the present invention.

Referring to FIG. 6, the data buffer 400 includes an upper bit latch 410, a multiplexer (MUX) 420, and a lower bit latch 430. The MUX 420 includes MUX switches MS1 and MS2 controlled by the switch control signal SC. For convenience of explanation, the counter 500 and the switch controller 600 are illustrated in FIG. 6. In addition, FIG. 6 illustrates the structure for the sub-sampling operation of the first and third columns in the sub-sampling mode.

Figure 7:
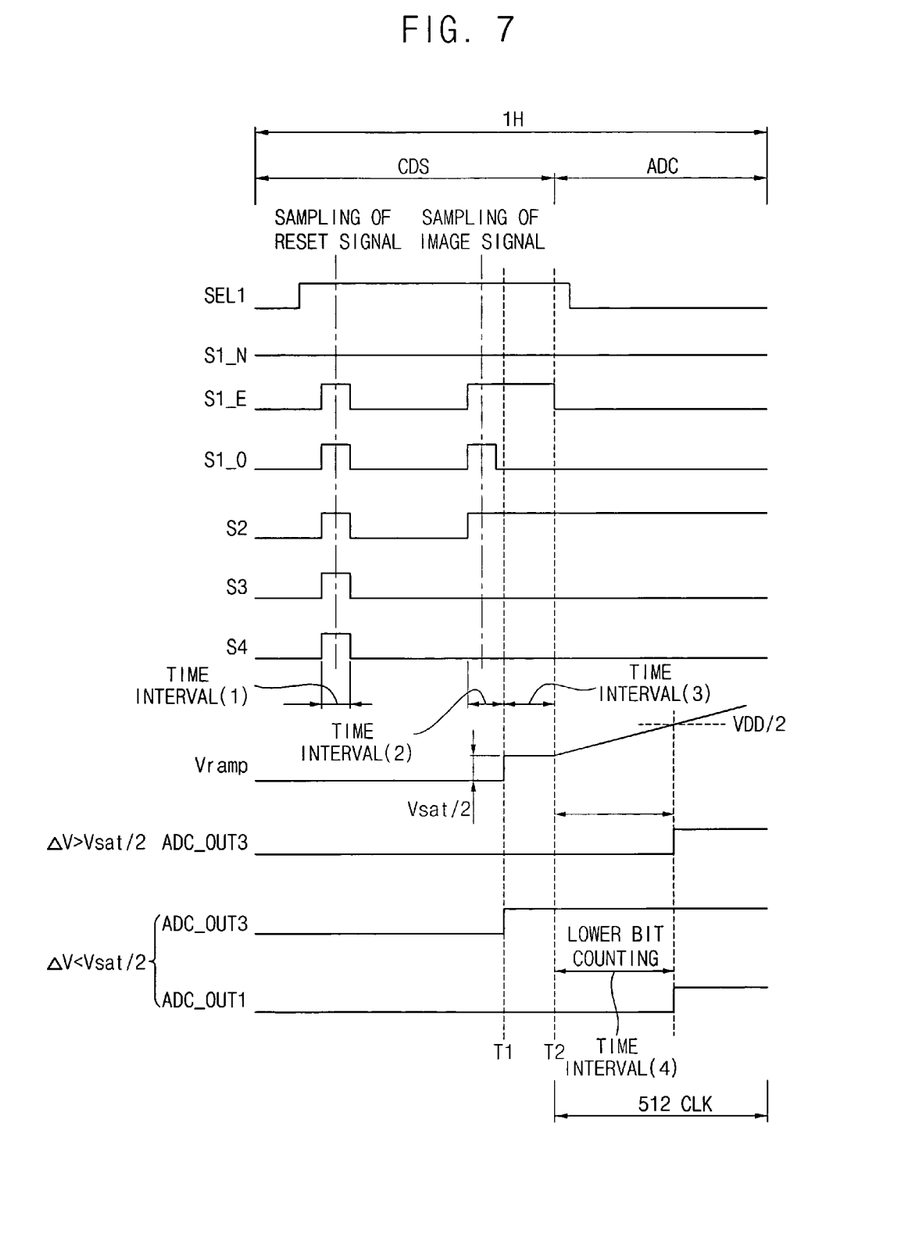
FIG. 7 is a timing diagram for explaining a column analog-to-digital conversion operation according to an exemplary embodiment of the present invention.

FIG. 7 is an operation timing diagram for explaining the column analog-to-digital conversion according to an exemplary embodiment of the present invention. FIGS. 8A to 8D are diagrams for explaining voltage variation of a ramp signal Vramp and voltage comparison of voltages of correlated double sampled pixel output signals for determining upper bit code values of the digital codes according to an exemplary embodiment of the present invention.

A sub-sampling operation according to an exemplary embodiment of the present invention will be described below in more detail with reference to FIGS. 5A, 5B, 6, 7 and 8A to 8D.

Referring to FIG. 7, the sub-sampling operation with the sub-sampling ratio of 1/2 ratio is performed between the first and third pixels corresponding to a row selected by the row select signal SEL1. In the 1/2 sub-sampling operation mode, only one of the two pixels (for example, the first pixel output signal APS_OUT1 from the first column) is outputted as a digital code.

In time intervals (1) and (2), the reset signal and the image signal of the first pixel output signal APS_OUT1 are correlated double sampled. The pixel output switch S1_N of the second CDS and comparison unit 330 of the third column is in an off state and the transfer switch S1_N is in the off state in the time intervals (1) and (2). The second pixel output signal APS_OUT3 of the third column is ignored. The CDS result, that is, the voltage difference of the reset signal and the image signal, is simultaneously stored in the capacitors C1 and C2 of the first and second CDS and comparison units 310 and 330.

In time interval (3), the second CDS and comparison unit 330 performs a comparison operation for determining the MSB code value of the first pixel output signal APS_OUT1. The determination of the MSB code value is performed in the adjacent same-colored CDS and comparison unit not operating in the sub-sampling mode (for example, the second CDS and comparison unit 330). The ramp signal Vramp is increased by half the pixel saturation voltage Vsat (Vsat/2) in a time point T1. The saturation voltage Vsat represents a voltage when light incident onto the pixel is brightest.

Figure 8A:
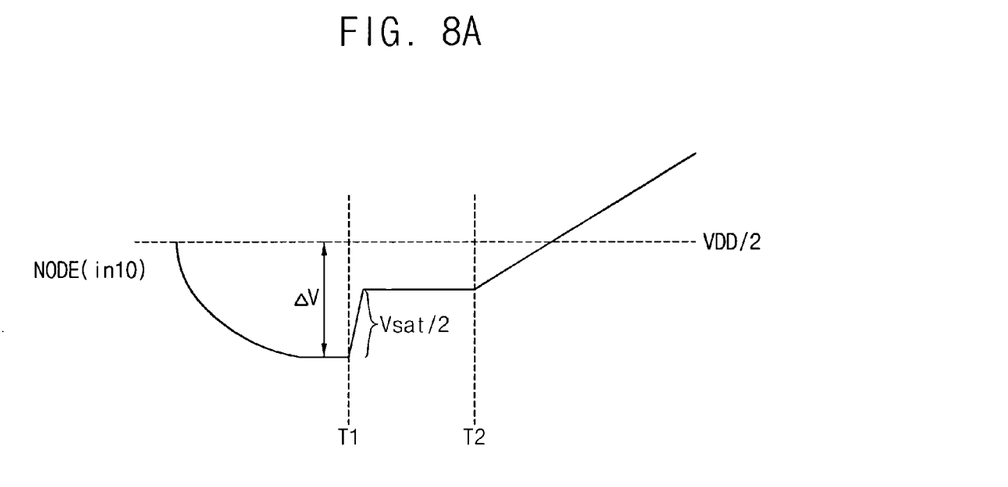
FIGS. 8A to 8D are diagrams for explaining voltage variation of a ramp signal and voltage comparison of voltages of correlated double sampled pixel output signals for determining code values of upper bits according to an exemplary embodiment of the present invention.

As illustrated in FIG. 8A, if the CDS result voltage, that is, the voltage difference ΔV of the reset signal and the image signal in the first pixel output signal APS_OUT1, is greater than the voltage variation (Vsat/2) of the ramp signal Vramp, a voltage of a node in 10 is lower than the comparison voltage (VDD/2) that is a logic threshold voltage of the amp A1, and the second comparison result signal ADC_OUT3 from the second CDS and comparison unit 330 maintains a low level state.

Figure 8B:
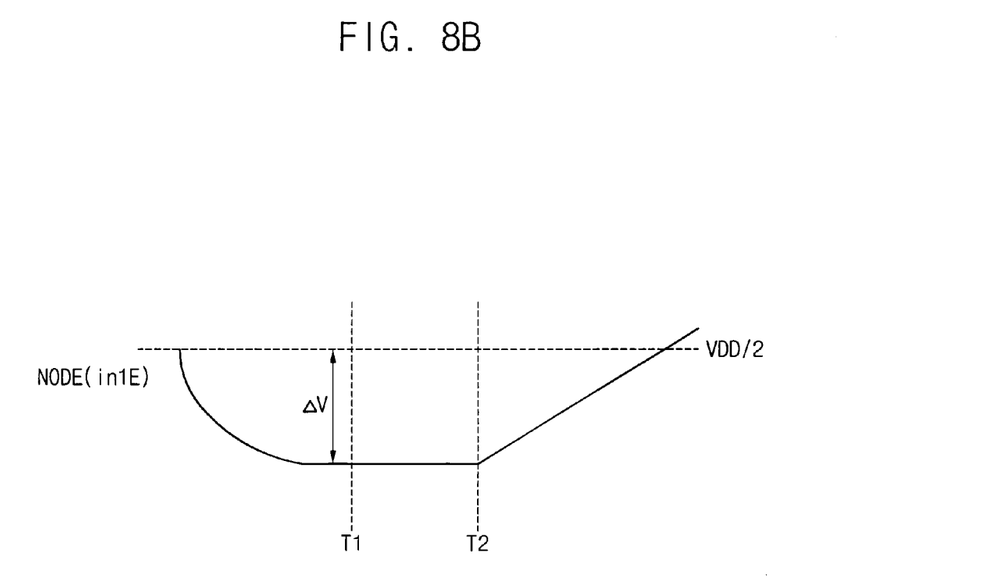

The comparison result of the voltage difference ΔV and the voltage of Vsat/2 indicates the MSB code value, the MSB code value from the second comparison result signal ADC_OUT3 of the low level may be determined as "1". The second comparison result signal ADC_OUT3 of the low level is inverted and stored in the latch of the corresponding column of the MSB latch 420, wherein the MSB code value "1" is stored in the latch of the corresponding column of the MSB latch 420. The pixel output switch S1_E of the first CDS and comparison unit 310 of the first column is in the on state during the time interval (3), and a voltage of a node in 1E of the first CDS and comparison unit 310 maintains the voltage given after the CDS operation, as illustrated in FIG. 8B.

Figure 8C:
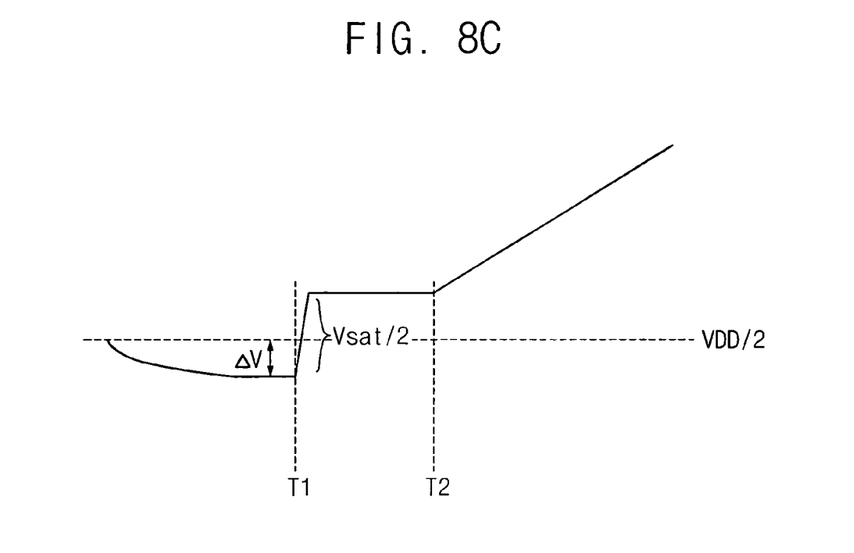
Figure 8D:
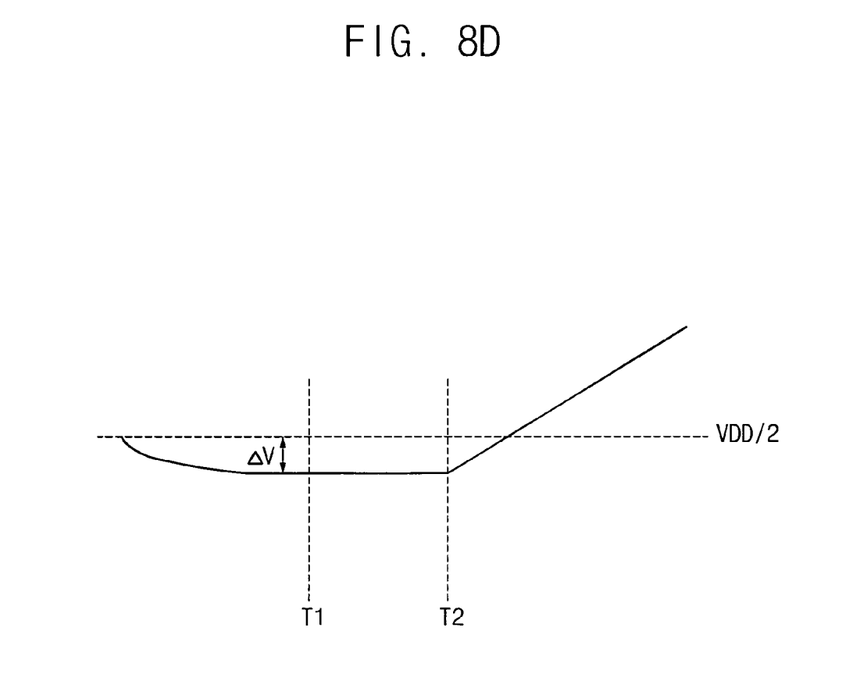

As illustrated in FIG. 8C, if the CDS result voltage, that is, the voltage difference ΔV between the reset signal and the image signal of the first pixel output signal APS_OUT1, is smaller than the voltage variation (Vsat/2) of the ramp signal Vramp, a voltage of a node in10 is higher than the comparison voltage (VDD/2) of the amp A1, and the second comparison result signal ADC_OUT3 from the second CDS and comparison unit 330 changes to a high level state.

The MSB code value from the second comparison result signal ADC_OUT3 of the high level may be determined as "0". The second comparison result signal ADC_OUT3 of the high level is inverted and stored in the latch of the corresponding column of the upper bit latch 420, and the MSB code value "0" is stored in the latch of the corresponding column of the upper bit latch 420.

In the time interval (4), an operation of determining the remaining lower bit code value of the first pixel output signal APS_OUT1 is performed. The remaining lower bit code value is determined using the increasing ramp signal Vramp and the counter 500.

To generate the digital code, the ramp signal Vramp undergoes two conversions, in which the ramp signal Vramp is changed to a predetermined voltage level within a short amount of time and the voltage level is then changed. The ramp signal Vramp includes two conversion sections. These conversion sections may be implemented without any structural modification by using a switch of an R-C integrator, that is, an existing ramp voltage generator.

A voltage level of the ramp voltage Vramp increases from the time point T2. From time point T2, the counter 500 begins to perform a counting operation for determining the remaining lower bit code value. The counting value from the counter 500 is stored in the lower bit latch 430. The storing operation of the counting value is stopped in response to the first and second comparison result signals ADC_OUT1 and ADC_OUT3 provided as a latch operation stop signal from the first and second CDS and comparison units 310 and 330.

As illustrated in FIG. 7, when the voltage difference ΔV between the reset signal and the image signal of the first pixel output signal APS_OUT1 is greater than the voltage variation (Vsat/2) of the ramp signal Vramp, the second comparison result signal ADC_OUT3 is used as the latch operation stop signal. When the voltage difference ΔV between the reset signal and the image signal of the first pixel output signal APS_OUT1 is smaller than the voltage variation (Vsat/2) of the ramp signal Vramp, the first comparison result signal ADC_OUT1 is used as the latch operation stop signal.

The operation of transferring the first comparison result signal ADC_OUT1 or the second comparison result signal ADC_OUT3 to the lower bit latch 430 is performed by the MUX switches MS1 and MS2 of the MUX 420. When the MUX switch MS2 of the third column is in the off state, the MUX switch MS1 of the first column is connected to a position (A) or (B) according to a previously determined MSB code value. In the normal mode, the MUX switch MS2 of the third column is in the on state and the MUX switch MS1 of the first column is connected to the position (A), so that the ADC operation is independently performed in each of the columns.

In response to the latch output control signal LC, the LSB code value determined by the first comparison result signal ADC_OUT1 or the second comparison result signal ADC_OUT3 is added to the MSB code value, and the resultant value is outputted as the final digital code DS1 (for example, 10-bit data) of the first pixel output signal APS_OUT1 in the sub-sampling mode. In other columns, the sub-sampled digital codes are sequentially outputted in each of the columns.

In the sub-sampling mode, a horizontal line time includes a CDS time interval and an ADC time interval.

For example, when a 10-bit digital code is generated by the CDS and an analog-to-digital conversion of the pixel output signal in the sub-sampling mode, the voltage level of the ramp signal is converted through two conversion processes, and the MSB among the 10 bits is first determined in the time interval (3), and the remaining 9 bits are determined in the time interval (4).

According to an exemplary embodiment of the present invention, the analog-to-digital conversion may be performed for a period of 512 clocks corresponding to 9 bits from the time point T2. Therefore, the horizontal line time in the sub-sampling mode may be reduced.

Although a 1/2 sub-sampling operation has been described above, embodiments of the present invention may also be applied to various sub-sampling ratios. When the sub-sampling ratio is 1/2n (wherein n is a natural number), (2n−1) number of upper bit code values including the MSB may be determined in an analog domain using (2n−1) number of adjacent same-colored CDS and comparison units. In this case, the ramp signal has voltage variation of the multiple of 1/2k (1≦k≦2n−1, wherein n and k are natural numbers) of the saturation voltage during the first conversion, and sequentially changes (2n−1) times.

Thereafter, during the second conversion, the voltage level of the ramp signal changes for determining the lower bit code value. Because those skilled in the art can implement the determination of the upper code value according to the variation of the ramp signal and the control of the comparison result signals according to the determined upper bit code value, a detailed description thereof will be omitted.

Figure 9:
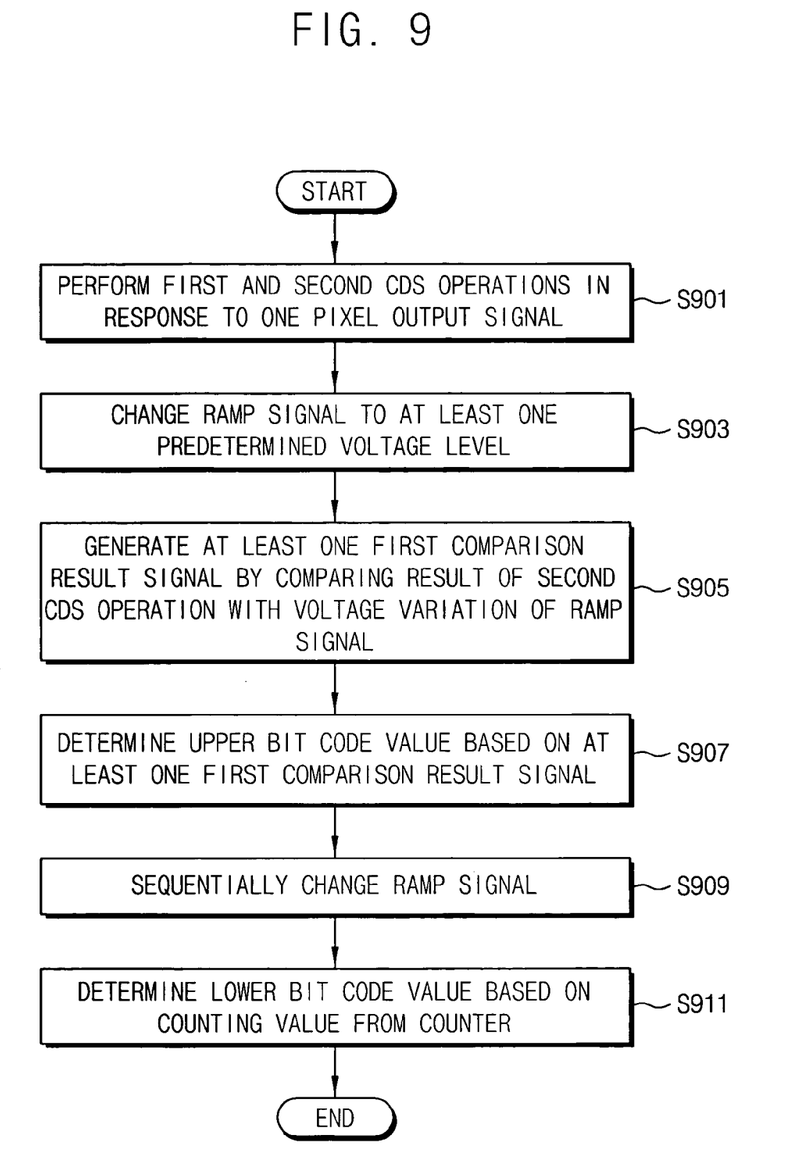
FIG. 9 is a flowchart diagram illustrating a method of column analog-to-digital conversion in a sub-sampling mode according to an exemplary embodiment of the present invention.

FIG. 9 is a flowchart diagram illustrating a method of column analog-to-digital conversion in a sub-sampling mode according to an exemplary embodiment of the present invention.

Referring to FIG. 9, a column analog-to-digital conversion method of a sub-sampling mode according to an exemplary embodiment of the present invention includes (block S901) performing first and second CDS operations in response to one pixel output signal, (block S903) changing a ramp signal to at least one predetermined voltage level, and (block S905) generating at least one first comparison result signal by comparing a result of the second CDS operation with a voltage variation of the ramp signal in response to the ramp signal of the operation (block S903). The method further includes (block S907) determining a code value of an upper bit based on the at least one first comparison result signal, (block S909) gradually changing a voltage level of the ramp signal after the operation (block S903), and (block S911) determining a lower bit for determining a code value of a lower bit in response to the ramp signal of the operation (block S909), based on a counting value outputted from a counter.

The voltage variation of the ramp signal in the operation (block S903) may be about a multiple of 1/2n (where n is a natural number) of a saturation voltage of the one pixel output signal. The column analog-to-digital conversion method may further include generating a second comparison result signal by comparing a result of the first CDS operation with a predetermined comparison voltage in response to the ramp signal of the operation (block S909). The counting value of the operation (block S911) is controlled by at least one first comparison result signal or the second comparison result signal.

While the present invention has been described with respect to exemplary embodiments, it will be apparent to those skilled in the art that various changes and modifications may be made without departing from the spirit and scope of the invention.

What is claimed is:

1. A column analog-to-digital conversion apparatus comprising:
 a first correlated double sampling (CDS) and comparison unit of a CDS and comparison circuit for generating a first comparison result signal in response to a first pixel output signal and a ramp signal;
 a second CDS and comparison unit of the CDS and comparison circuit for generating a second comparison result signal in response to the first pixel output signal and the ramp signal in a sub-sampling mode; and
 a data buffer for determining a code value of a most significant bit (MSB) based on the second comparison result signal, determining code values of remaining lower bits based on a counting value outputted from a counter, and generating a digital code comprising the MSB and the remaining lower bits.

2. The column analog-to-digital conversion apparatus of claim 1, wherein the ramp signal includes a first conversion section having a predetermined voltage level and a second conversion section of gradually changing the predetermined voltage level for the generation of the digital code.

3. The column analog-to-digital conversion apparatus of claim 2, wherein the code value of the MSB is determined during the first conversion section, the code values of the remaining lower bits are determined during the second conversion section.

4. The column analog-to-digital conversion apparatus of claim 3, wherein a voltage variation of the ramp signal during the first conversion section is about 1/2 of a saturation voltage of the first pixel output signal.

5. The column analog-to-digital conversion apparatus of claim 3, further comprising a transfer switch for transferring the first pixel output signal to the second CDS and comparison unit in the sub-sampling mode,
wherein the first CDS and comparison unit includes a first ramp switch and a first pixel output switch for transferring the ramp signal and the first pixel output signal, respectively, and the second CDS and comparison unit includes a second ramp switch and a second pixel output switch for transferring the ramp signal and the second pixel output signal, respectively.

6. The column analog-to-digital conversion apparatus of claim 5, wherein the first conversion section of the ramp signal is formed when the first pixel output switch is in an on state and the transfer switch is in an off state after a reset signal and an image signal of the first pixel output signal are sampled.

7. The column analog-to-digital conversion apparatus of claim 2, wherein the data buffer includes an MSB latch, a multiplexer (MUX), and a lower bit latch that are connected in series.

8. The column analog-to-digital conversion apparatus of claim 7, further comprising a switch controller for generating a switch control signal in response to the MSB from the MSB latch and an operation mode signal, to the switch control signal for controlling switches of the MUX.

9. The column analog-to-digital conversion apparatus of claim 8, wherein the MUX
transfers the second comparison result signal as a latch operation stop signal to the lower bit latch in response to the switch control signal when a voltage difference between a reset signal and a image signal of the first pixel output signal is greater than a voltage variation due to a change of the ramp signal to the predetermined voltage level, and
transfers the first comparison result signal as the latch operation stop signal to the lower bit latch in response to the switch control signal when the voltage difference between the reset signal and the image signal of the first pixel output signal is greater than the voltage variation due to the change of the ramp signal to the predetermined voltage level.

10. The column analog-to-digital conversion apparatus of claim 7, wherein the counter transfers the counting value to the lower bit latch in the sub-sampling mode in response to the operation mode signal and a counter enable signal, the counter enable signal being activated at a starting time point of the second conversion section of the ramp signal in the sub-sampling mode.

11. A column analog-to-digital conversion apparatus comprising:
a first correlated double sampling (CDS) and comparison unit of a CDS and comparison circuit for generating a first comparison result signal in response to a first pixel output signal and a ramp signal;
a plurality of second CDS and comparison units of the CDS and comparison circuit for generating a plurality of second comparison result signals in response to the first pixel output signal and the ramp signal in a sub-sampling mode; and
a data buffer for determining code values of upper bits including a most significant bit (MSB) based on the plurality of second comparison result signals, determining code values of remaining lower bits based on a counting value outputted from a counter, and generating a digital code comprising the MSB and the remaining lower bits.

12. The column analog-to-digital conversion apparatus of claim 11, wherein the ramp signal includes a first conversion section having a plurality of predetermined voltage levels and a second conversion section of changing the predetermined voltage levels for the generation of the digital code.

13. The column analog-to-digital conversion apparatus of claim 12, wherein the code values of the upper bits are determined during the first conversion section, the code values of the remaining lower bits are determined during the second conversion section.

14. The column analog-to-digital conversion apparatus of claim 13, wherein a voltage variation of the ramp signal during the first conversion section is about a multiple of 1/2n of a saturation voltage of the first pixel output signal, n being a natural number.

15. The column analog-to-digital conversion apparatus of claim 13, further comprising a plurality of transfer switches for transferring the first pixel output signal to the second CDS and comparison units in the sub-sampling mode,
wherein the first CDS and comparison unit includes a first ramp switch and a first pixel output switch for transferring the ramp signal and the first pixel output signal, respectively, and each of the second CDS and comparison units includes a second ramp switch and a second pixel output switch for transferring the ramp signal and the second pixel output signal, respectively.

16. The column analog-to-digital conversion apparatus of claim 15, wherein the first conversion section of the ramp signal is formed when the first pixel output switch is in an on state and the transfer switch is in an off-state, after a reset signal and an image signal of the first pixel output signal are sampled.

17. The column analog-to-digital conversion apparatus of claim 12, wherein the data buffer includes an upper bit latch, a multiplexer (MUX), and a lower bit latch that are connected in series.

18. The column analog-to-digital conversion apparatus of claim 17, further comprising a switch controller for generating a switch control signal in response to upper bit signals from the upper bit latch and an operation mode signal, the switch control signal for controlling switches of the MUX.

19. The column analog-to-digital conversion apparatus of claim 18, wherein logic states of the second comparison result signals determining the upper bit signals and the code values of the upper bits are determined by comparing a voltage difference between a reset signal and an image signal of the first pixel output signal with a voltage variation due to a change of the ramp signal to the predetermined voltage levels in the sub-sampling mode, and
wherein the MUX transfers one of the first comparison result signal and the second comparison result signals as a latch operation stop signal to the lower bit latch in response to the switch control signal.

20. The column analog-to-digital conversion apparatus of claim 17, wherein the counter transfers the counting value to the lower bit latch in the sub-sampling mode in response to the operation mode signal and a counter enable signal, the counter enable signal being activated at a starting time point of the second conversion section of the ramp signal in the sub-sampling mode.

21. A column analog-to-digital conversion method of a sub-sampling mode of a column analog-to-digital conversion apparatus, comprising:

performing first and second CDS (correlated double sampling) operations in response to a pixel output signal;

changing a ramp signal to at least one predetermined voltage level;

generating at least one first comparison result signal by comparing a result of the second CDS operation with a voltage variation of a changed ramp signal;

determining a code value of an upper bit based on the at least one first comparison result signal;

changing a voltage level of the changed ramp signal; and determining a code value of a lower bit in response to the changed ramp signal, based on a counting value outputted from a counter.

22. The column analog-to-digital conversion method of claim 21, wherein the voltage variation of the changed ramp signal is about a multiple of 1/2n of a saturation voltage of the pixel output signal, n being a natural number.

23. The column analog-to-digital conversion method of claim 22, further comprising:

generating a second comparison result signal by comparing a result of the first CDS operation with a predetermined comparison voltage in response to the changed ramp signal, wherein the counting value is controlled by at least one first comparison result signal or the second comparison result signal.

* * * * *